(12) United States Patent
Park

(10) Patent No.: US 8,256,483 B2
(45) Date of Patent: Sep. 4, 2012

(54) APPARATUS FOR AUTOMATICALLY PUNCHING AND BONDING MEA MATERIALS FOR FUEL CELL

(75) Inventor: Chang Min Park, Ulsan (KR)

(73) Assignee: Hyundai Motor Company, Seoul (KR)

( * ) Notice: Subject to any disclaimer, the term of this patent is extended or adjusted under 35 U.S.C. 154(b) by 483 days.

(21) Appl. No.: 12/284,172

(22) Filed: Sep. 19, 2008

(65) Prior Publication Data

US 2009/0255632 A1 Oct. 15, 2009

(30) Foreign Application Priority Data

Apr. 11, 2008 (KR) .................. 10-2008-0033938

(51) Int. Cl.
*H01M 8/00* (2006.01)
*B30B 9/00* (2006.01)
*B32B 38/04* (2006.01)

(52) U.S. Cl. ..... 156/517; 156/556; 156/567; 156/583.1; 429/535

(58) Field of Classification Search .................. 156/510, 156/516, 517, 539, 556, 563, 567, 569, 571, 156/250, 256, 269, 270, 580, 583.1, 583.2, 156/583.6, 583.7, 583.8, 583.9, 583.91; 429/36, 429/535; 234/38, 126
See application file for complete search history.

(56) References Cited

U.S. PATENT DOCUMENTS

| 4,668,314 A * | 5/1987 | Endoh et al. ..................... 156/64 |
| 6,641,703 B2 | 11/2003 | Nomura et al. |
| 2006/0151087 A1* | 7/2006 | Mizuta ............................. 156/64 |
| 2006/0269384 A1* | 11/2006 | Kiaie et al. ............... 414/222.02 |
| 2008/0145712 A1* | 6/2008 | Pierpont et al. .................. 429/12 |

FOREIGN PATENT DOCUMENTS

| GB | 2107649 | * 10/1981 |
| JP | 2000-100642 | 4/2000 |
| JP | 2001-194372 | 7/2001 |
| JP | 2002-164046 | 6/2002 |
| JP | 2005-108571 | 4/2005 |
| JP | 2006-244930 | 9/2006 |
| JP | 2007-172844 | 7/2007 |
| JP | 2007-214077 | 8/2007 |
| JP | 2007-220612 | 8/2007 |
| KR | 10-0704614 | 4/2007 |

* cited by examiner

*Primary Examiner* — Katarzyna Wyrozebski Lee
*Assistant Examiner* — Scott D Dodds
(74) *Attorney, Agent, or Firm* — Edwards Wildman Palmer LLP; Peter F. Corless

(57) ABSTRACT

The present invention provides an apparatus for automatically punching and bonding MEA materials for a fuel cell, which can automatically and continuously perform a punching process and a bonding process for the MEA materials by improving a conventional method in which a 5-layer MEA material is manually manufactured. Accordingly, it is possible to reduce the time required to manufacture the 5-layer MEA, provide a reduction in manpower and an efficient production, enable mass production, and improve the quality of the finished 5-layer MEA material.

9 Claims, 4 Drawing Sheets

APPARATUS FOR AUTOMATICALLY PUNCHING AND BONDING MEA MATERIALS FOR FUEL CELL

CROSS-REFERENCE TO RELATED APPLICATION

This application claims under 35 U.S.C. §119(a) the benefit of Korean Patent Application No. 10-2008-0033938 filed Apr. 11, 2008, the entire contents of which are incorporated herein by reference.

BACKGROUND (a) Technical Field

The present invention relates to an apparatus for automatically punching and bonding membrane electrode assembly (MEA) materials for a fuel cell. More particularly, the present invention relates to an apparatus for automatically punching and bonding MEA materials for a fuel cell, which can automatically and continuously perform a punching process and a bonding process for the MEA materials by improving a conventional method in which a 5-layer MEA material is manually manufactured.

(b) Background Art

A fuel cell is an electricity generation system that does not convert chemical energy of fuel into heat by combustion, but electrochemically converts the chemical energy directly into electrical energy in a fuel cell stack. A fuel cell can be applied to the supply of electric power for small-sized electrical/electronic devices, for example, portable devices, as well as to the supply of electric power for industry, home, and vehicles.

At present, the most attractive fuel cell for a vehicle is a polymer electrolyte membrane fuel cell (PEMFC), also called a proton exchange membrane fuel cell, having the highest power density among the fuel cells. The PEMFC has a fast start-up time and a fast reaction time for power conversion due to its low operation temperature.

The PEMFC comprises: a membrane electrode assembly (hereinafter referred to as an MEA) including a polymer electrolyte membrane for transporting hydrogen ions and an electrode/catalyst layer, in which an electrochemical reaction takes place, disposed on both sides of the polymer electrolyte membrane; a gas diffusion layer (hereinafter referred to as a GDL) for uniformly diffusing reactant gases and transmitting generated electricity; a gasket and a sealing member for maintaining the airtightness of the reactant gases and coolant and for providing an appropriate bonding pressure; and a bipolar plate for transferring the reactant gases and coolant.

In a fuel cell having the above-described configuration, hydrogen as a fuel is supplied to an anode (also referred to as a fuel electrode or oxidation electrode), and oxygen (air) as an oxidizing agent is supplied to a cathode (also referred to as an air electrode, oxygen electrode, or reduction electrode).

The hydrogen supplied to the anode is dissociated into hydrogen ions (protons, $H^+$) and electrons ($e^-$) by a catalyst of the electrode/catalyst layer that is provided on both sides of the electrolyte membrane. At this time, only the hydrogen ions are transmitted to the cathode through the electrolyte membrane, which is preferably a cation exchange membrane, and at the same time the electrons are transmitted to the anode through the GDL and the bipolar plate, which serve as conductors.

At the anode, the hydrogen ions that are supplied through the electrolyte membrane and the electrons that are transmitted through the bipolar plate meet the oxygen in the air supplied to the anode by an air supplier and cause a reaction that produces water.

Due to the movement of hydrogen ions caused at this time, the flow of electrons through an external conducting wire occurs, and thus a current is generated.

The electrode reactions in the polymer electrolyte membrane fuel cell can be represented by the following formulas:

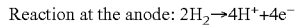

Reaction at the anode: $2H_2 \rightarrow 4H^+ + 4e^-$

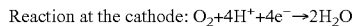

Reaction at the cathode: $O_2 + 4H^+ + 4e^- \rightarrow 2H_2O$

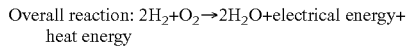

Overall reaction: $2H_2 + O_2 \rightarrow 2H_2O +$ electrical energy+ heat energy As exemplified in the above reaction formulas, a hydrogen molecule is dissociated into four hydrogen ions and four electrons at the anode. The generated electrons move through an external circuit to generate a current, and the generated hydrogen ions move to the cathode through the electrolyte membrane to perform a reduction electrode reaction.

The fuel cell stack is formed by repeatedly stacking a plurality of unit cells, and each of the unit cells has a structure in which the bipolar plate, the GDL, and the MEA are stacked.

In manufacturing the fuel cell stack, the components of the unit cell such as the bipolar plate, the GDL, and the MEA are repeatedly stacked. In a 5-layer MEA material, the GDLs and the MEA are stacked in a 5-layer structure, and the bipolar plates are stacked alternately and assembled.

The 5-layer MEA material has a structure in which two GDLs are additionally bonded to a 3-layer MEA, including an electrolyte membrane and electrode catalysts (a cathode catalyst and an anode catalyst), which will be described in more detail with reference to FIGS. 1 and 2 below.

As shown in FIG. 1, a cathode catalyst 2 and an anode catalyst 3 are preferably bonded on the top and bottom sides of a Nafion membrane (a suitable electrolyte membrane) 1 to prepare a 3-layer MEA, and a sub-gasket 4 is bonded to the top and bottom sides of the Nafion membrane 1, except for the catalyst portions, to facilitate the handling of the 3-layer MEA.

In the preparation of the 3-layer MEA to which the sub-gaskets 4 are bonded, the portions corresponding to manifolds are punched to form openings 6 as shown in FIG. 2. Preferably, the GDL 7 is bonded to the top and bottom of the 3-layer MEA with the manifold openings 6 at high temperature and high pressure, thus forming a 5-layer MEA material 8.

A conventional method of forming the 5-layer MEA material 8 includes fixing the 3-layer MEA 5 including the sub-gaskets 4 on a manifold punch press, manually operating the press to punch the manifolds openings 6, removing a backing sheet attached to protect the catalyst layer, transferring the resulting 3-layer MEA 5 to a hot press device, stacking the GDL 7, the 3-layer MEA 5, the GDL 7 in the sequential order, and operating the hot press device, thus completing a final 5-layer MEA material 8.

In this example, since the hot press device bonds the 3-layer MEA and the GDLs under high temperature and high pressure conditions, the hot pressing process requires considerable time and, for example, the process of punching the manifold openings on the 3-layer MEA and the hot-pressing process of stacking and bonding the GDLs is not automated.

Accordingly, during the punching process, the manifold punch press is manually operated and, as such, the resulting 3-layer MEA materials are manually transferred to the hot press device for the hot-pressing process by a worker. After stacking the GDLs and the 3-layer MEA, the hot press device is also manually operated to perform the hot-pressing process. Accordingly, it takes considerable time to perform the punching process and the hot-pressing process.

During the manual bonding process as described above, the supply of the finished 5-layer MEA materials is not generated according to a smooth or regular process, thus an automatic stacking device is operated only after a necessary amount of the 5-layer MEA materials is gathered to complete the fabrication of the fuel cell stack.

Furthermore, the performance of the fuel cell stack as well as the working time may be varied according to the workers who perform the stacking process, and thus waste of manpower, inefficient production, a difficult in mass production, and the like may occur.

The above information disclosed in this Background section is only for enhancement of understanding of the background of the invention and therefore it may contain information that does not form the prior art that is already known in this country to a person of ordinary skill in the art.

SUMMARY

In one aspect, the present invention is directed to an apparatus for automatically punching and bonding MEA materials for a fuel cell, which can automatically and continuously perform a punching process and a bonding process for the MEA materials by improving a conventional method in which a 5-layer MEA material is manually manufactured.

In one embodiment, the present invention provides an apparatus for automatically punching and bonding MEA materials for a fuel cell, the apparatus preferably comprising: an automatic punching device, which suitably performs a punching process, in which a continuously supplied multi layer MEA material, preferably a 3-layer MEA material, passes through a punch press to form a manifold opening thereon, and a cutting process for cutting the punched 3-layer MEA material into individual materials; a lift & turntable device for continuously supplying the 3-layer MEA material after the punching process by the automatic punching device to a turntable device of an automatic bonding device; and the automatic bonding device including the turntable device, on which a receiving frame for receiving the material is mounted, and a hot press device for a hot press bonding process, and performing the hot press bonding process when the receiving frame, on which the 3-layer MEA material and a gas diffusion layer (GDL) are stacked, is transferred step by step during rotation of the turntable device by the lift & turntable device.

In another preferred embodiment, the preferred automatic punching device comprises: a roll supply device for separating a backing sheet from a 3-layer MEA material roll and continuously supplying the separated 3-layer MEA material; a suitable robot device, preferably a 1-axis robot device, for clamping the front end of the 3-layer MEA material separated from the backing sheet and transferring the 3-layer MEA after the punching process and the cutting process to a turntable of the lift & turntable device; and a punch press arranged so that the 3-layer MEA material being transferred by the 1-axis robot device passes through an upper platen and a lower platen thereof and performing the punching process and the cutting process by the operation of the upper and lower platens.

In another preferred embodiment, the roll supply device comprises: an upper roller to which the 3-layer MEA material attached to the backing sheet is mounted; and a lower roller on which the backing sheet separated from the 3-layer MEA material released from the upper roller is wound.

In still another preferred embodiment, the automatic bonding device comprises: the turntable device including a plurality of the receiving frames preferably circularly moved during rotation; a scara robot preferably provided in the middle of the turntable device and picking up the GDLs of GDL supply portions to place the GDLs on the receiving frames of the turntable device and transferring a finished 5-layer MEA material after the hot press bonding process from the receiving frame to a cartridge; and the hot press device arranged so that the receiving frame circularly moved passes therethrough and bonding the 3-layer MEA material and the GDL on the receiving frame of the turntable device.

In yet another preferred embodiment, the scara robot successively performs a series of processes of picking up the GDLs of the GDL supply portions to place the GDL on an empty receiving frame and on the 3-layer MEA material on the receiving frame and transferring the finished 5-layer MEA material after the hot process bonding process from the receiving frame to the cartridge every time when the turntable device is rotated step by step.

In still yet another preferred embodiment, the plurality of receiving frames is circularly arranged at regular intervals on the turntable device.

In a further preferred embodiment, a plurality of the hot press devices is provided along the transfer path of the receiving frames so that the materials on the receiving frame sequentially pass through the plurality of hot press devices along the transfer path thereof by the step-by-step rotation of the turntable device and thus a multistage hot press process is performed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
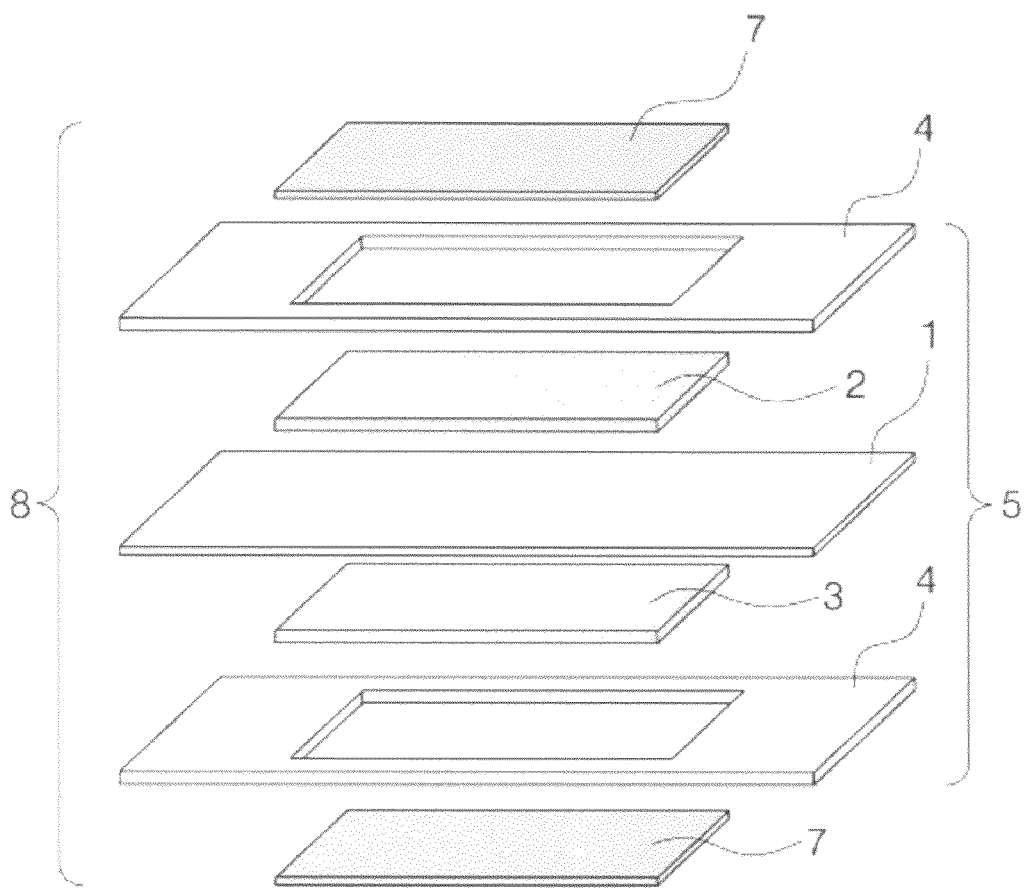
FIG. 1 is a perspective view showing a configuration of a 5-layer MEA material.
Figure 2:
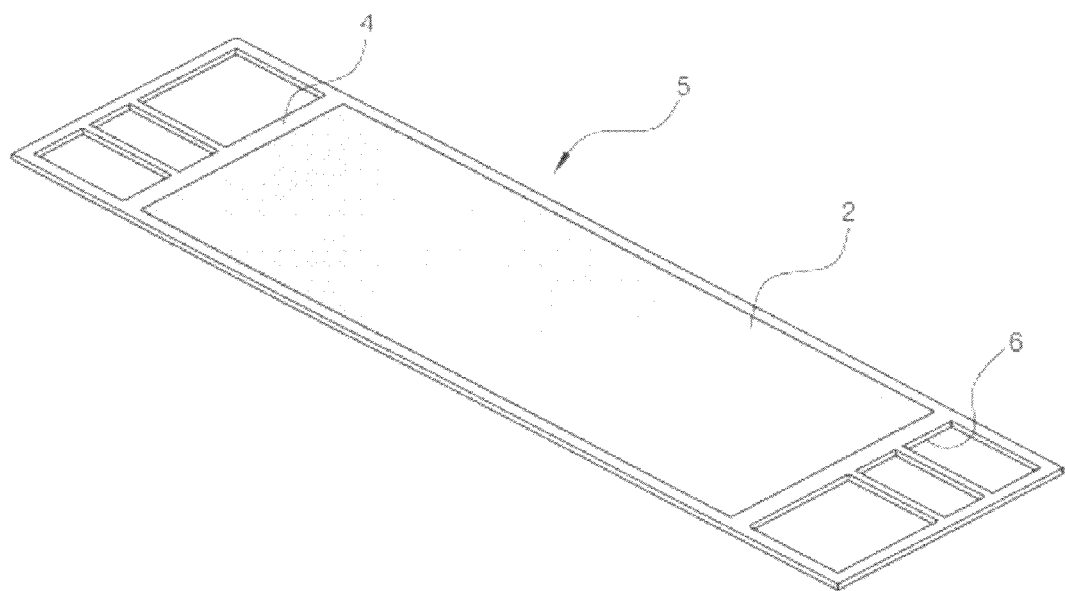
FIG. 2 is a perspective view showing a 3-layer MEA material.

Reference numerals set forth in the Drawings includes reference to the following elements as further discussed below:

| | |
|---|---|
| 100: | automatic punching device |
| 110: | roll supply device |
| 120: | punch press |
| 130: | 1-axis robot device |
| 200: | lift & turntable device |
| 210: | turntable |
| 300: | automatic bonding device |
| 301, 302: | GDL supply portion |
| 310: | turntable device |
| 311: | receiving frame |
| 320: | scara robot |
| 330: | hot press device |
| 400: | cartridge |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features an apparatus for punching and bonding MEA materials for a fuel cell, the apparatus preferably comprising a punching device, which performs a punching process, in which a continuously supplied MEA material passes through a punch press to form a manifold opening thereon a lift & turntable device, and the bonding device including the turntable device, on which a receiving frame for receiving the material is mounted, and a hot press device for a hot press bonding process, and performing the hot press bonding process when the receiving frame, on which the MEA material and a gas diffusion layer (GDL) are stacked, is transferred during rotation of the turntable device by the lift and turntable device.

In certain embodiments of the invention, the MEA material is a 3-layer MEA material. In other embodiments, the punching device, which performs a punching process, further comprises a cutting process for cutting the punched 3-layer MEA material into individual materials. In other embodiments of the invention, the lift and turntable device is used for continuously supplying the MEA material after the punching process by the punching device to a turntable device of a bonding device. In still further embodiments of the invention, the bonding device including the turntable device further comprises a hot press device for a hot press bonding process, wherein performing the hot press bonding process when the receiving frame, on which the MEA material and a gas diffusion layer (GDL) are stacked, is transferred during rotation of the turntable device by the lift and turntable device.

In certain embodiments of the invention, the punching device is an automatic punching device. In other certain embodiments of the invention, the bonding device is an automatic bonding device.

The transferring, in certain embodiments, can be by a step-by-step process.

The invention can also include a motor vehicle comprising an apparatus for punching and bonding MEA materials for a fuel cell according to any of the embodiments as described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
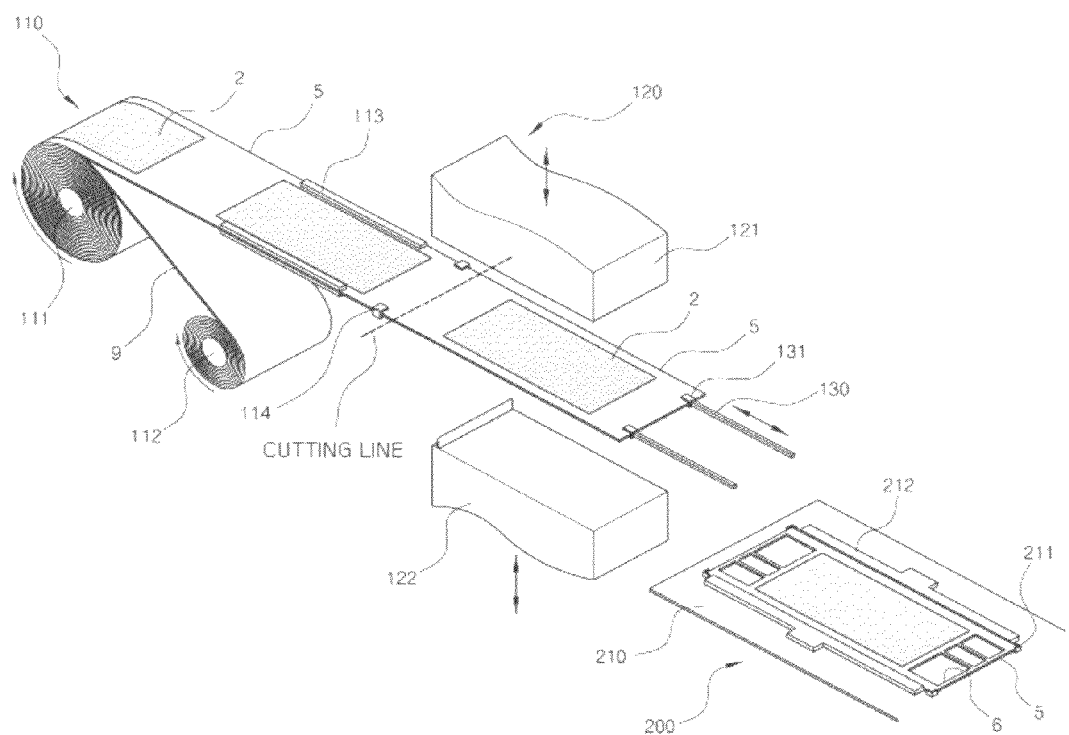
FIG. 3 is a schematic diagram showing an automatic punching device for a 3-layer MEA material in accordance with the present invention.
Figure 4:
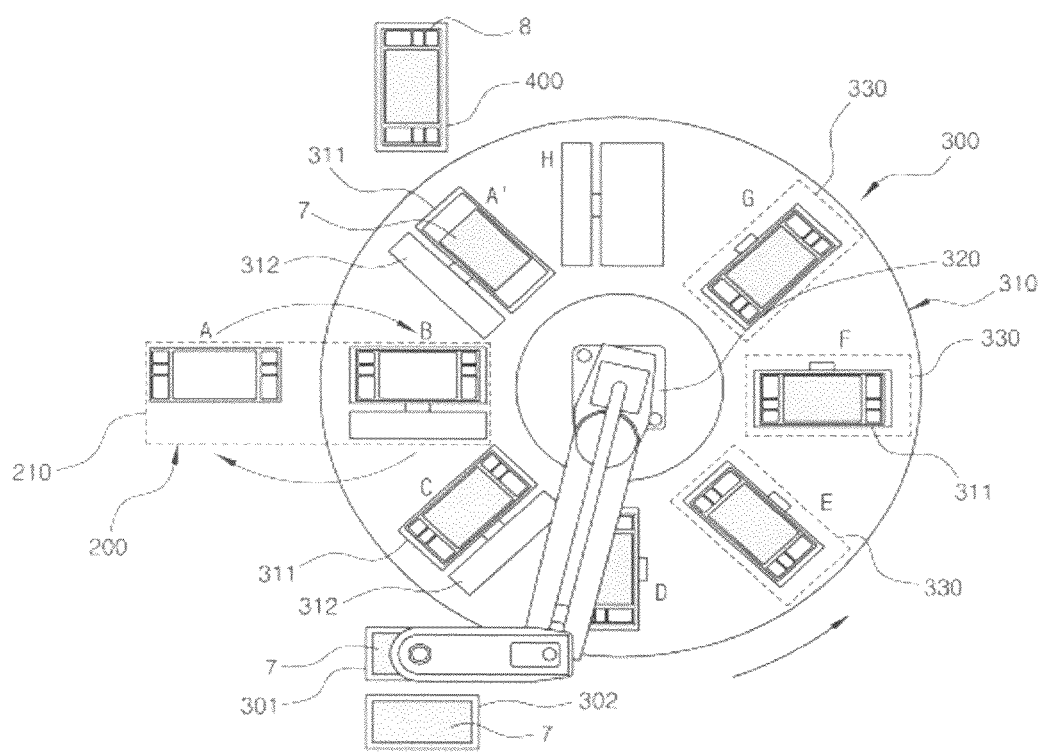
FIG. 4 is a plan view showing a configuration of an MEA-GDL automatic bonding device in accordance with the present invention.

Exemplary FIG. 3 is a schematic diagram showing an automatic punching device for a 3-layer MEA material in accordance with preferred embodiments of the present invention, and exemplary FIG. 4 is a plan view showing a configuration of an MEA-GDL automatic bonding device in accordance with certain preferred embodiments of the present invention.

In preferred embodiments, the present invention provides an apparatus for automatically punching and bonding MEA materials for a fuel cell, which can automatically and continuously perform a punching process and a bonding process for the MEA materials by suitably improving a conventional method of manually manufacturing a 5-layer MEA material.

Preferably, with the automated continuous punching and bonding processes in accordance with preferred embodiments of the present invention, it is possible to suitably reduce the time required to manufacture a 5-layer MEA material, to provide a reduction in manpower and efficient production, to enable mass production, and to improve the quality of the finished 5-layer MEA material.

Exemplary FIG. 3 shows a preferred automatic punching device 100 suitably performing the punching process for forming manifold openings 6 in a 3-layer MEA material 5 including a suitable electrolyte membrane (e.g., Nafion membrane), a cathode catalyst and an anode catalyst suitably bonded to the top and bottom of the electrolyte membrane, and a sub-gasket bonded to the top and bottom sides of the electrolyte membrane except for the catalyst portions of the membrane.

As exemplified in the figure, in certain preferred embodiments, the 3-layer MEA material 5 attached to a backing sheet 9 is continuously, or substantially continuously, supplied by a roll supply device 110 and, accordingly, in preferred embodiments, the 3-layer MEA material 5 attached to the backing sheet 9 is suitably prepared in the form of a roll and mounted on an upper roller 111.

Accordingly, while the 3-layer MEA material 5 with the backing sheet 9 is preferably released from the upper roller 111, the backing sheet 9 is suitably removed and wound on a lower roller 112, and the 3-layer MEA material that remains 5 is guided by a guide 113 to preferably pass between an upper platen 121 and a lower platen 122 of a punching press 120.

According to further embodiments, when a robot device, for example a 1-axis robot device 130 pulls the 3-layer MEA material 5, of which the front end is being clamped by a suitable clamp 131 of the 1-axis robot device 130, the 3-layer MEA material 5 is suitably separated from the backing sheet 9 and introduced into the punch press 120 along the guide 113.

Preferably, when the punch press 120 is preferably operated in a state where the clamp 131 of the 1-axis robot device 130 holds the 3-layer MEA material 5 together with a clamp 114 of the front end of the 3-layer MEA material, the upper platen 121 and the lower platen 122 are suitably lowered and lifted, respectively, to punch the 3-layer MEA material 5, thus forming suitable manifold openings 6.

Accordingly, the upper and lower platens 121 and 122 simultaneously perform a process of cutting the continuous 3-layer MEA material 5 into individual 3-layer MEAs having a suitable predetermined length. In further embodiments, when the upper platen 121 and the lower platen 122 are preferably closed, the 3-layer MEA material 5 is suitably cut by cutting blades provided on the upper and lower platens 121 and 122 into a suitable predetermined length, preferably simultaneously with the punching process. (for example, refer to a cutting line of FIG. 3).

In further embodiments, when the upper platen 121 and the lower platen 122 are preferably lifted and lowered, respectively, a mold is opened and the 1-axis robot device 130 suitably operates to pull and move the 3-layer MEA material 5 after the punching process and, according to further embodiments, to be placed on a guide 211 of a lift & turntable device 200.

Accordingly, the 3-layer MEA material 5 placed on the guide 211 of the lift & turntable device 200 has the manifold openings 6 suitably punched by the punch press 120 and preferably the position thereof is fixed on the lift & turntable device 200 by the guide 211 and a clamp 212.

In preferred embodiments, the initial position of the thus punched 3-layer MEA material 5 fixed on the lift & turntable device 200 preferably corresponds to position A of FIG. 4.

Accordingly, the 3-layer MEA material 5 punched during the punching process and suitably fixed on the lift & turntable device 200 is preferably located at position A of FIG. 4 for a hot press bonding process.

According to preferred embodiments of the present invention, as the lift & turntable device 200, any lift & turntable device that can suitably hold, lift, and lower a product and can suitably rotate at a predetermined angle may be used. Moreover, as the configuration of the lift & turntable device 200 is a well-known device to those of skill in the art, its detailed description will be omitted.

The 3-layer MEA material 5 fixed on a turntable 210, preferably at position A, is suitably lifted by a lift (not shown) of the lift & turntable device 200 and preferably moved to position B when the turntable 210 is rotated 180°. Accordingly, when the lift and the turntable 210 of the lift & turntable device 200 move down and the clamp 212 holding the 3-layer MEA material 5 is suitably opened, the 3-layer MEA material 5 is preferably placed on a receiving frame 311 (preferably at position B) of a turntable device 310 of an automatic bonding device 300.

Accordingly, the lift & turntable device 200 continuously supplies the 3-layer MEA materials 5 punched by the automatic punching device 100 to the turntable device 310 of the automatic bonding device 300.

The automatic bonding device 300 preferably includes, but is not only limited to: the turntable device 310 rotated by a motor (not shown), which is a drive actuator; a scara robot 320, suitably provided in the middle of the turntable device 310, for placing the GDL 7 on the receiving frame 311 of the turntable device 310 and transferring a finished 5-layer MEA material 8, preferably subjected to a hot-pressing process for bonding the GDLs 7, from the receiving frame 311 of the turntable device 310 to an external cartridge 400; and a hot press device 330 for suitably bonding the 3-layer MEA material 5 and the GDL 7 loaded on the receiving frame 311 of the turntable device 310.

In further embodiments, the turntable device 310 includes a plurality of the receiving frames 311 that are preferably circularly arranged at regular intervals so as to be moved circularly during rotation of the turntable device 310.

Preferably, as the turntable device 310 and the scara robot 320, any turntable device that can rotate a product at a predetermined angle step by step and any articulated robot that can pick up and move an object at a predetermined position are used in the invention as described herein. Such devices are well known to one of skill in the art. Accordingly, since the respective devices are well-known devices in the art, their detailed description will be omitted. However, the present invention is characterized in certain embodiments in that the automatic bonding device 300 for a fuel cell is preferably provided in combination with the scara robot 320, suitably arranged in the middle of the turntable device 310 for the hot press bonding process of the 3-layer MEA material and the GDL, and the hot press device 330.

In preferred embodiments, the rotation amount and the rotation angle of the turntable device 310 are precisely controlled by the driving of the motor and, according to other preferred embodiments of the present invention, the turntable device 310 is rotated by the driving of the motor at a suitably predetermined angle step by step to circularly move the receiving frame 311 on which the materials are placed so that the materials on the receiving frame 311 are preferably subjected to several processes in turn by the rotation of the turntable device 310.

In one exemplary embodiment, illustrated in the example shown in FIG. 4, a total of eight receiving frames 311 are arranged at suitably regular intervals on the turntable device 310, and the turntable device 310 is rotated 45° at each step to circularly move the materials.

In preferred embodiments, the scara robot 320 is an articulated robot that holds the GDL 7 from a first GDL supply portion 301 and a second GDL supply portion 302, preferably by a suitable vacuum holding means, and places the GDLs 7 on the designated receiving frames 311 at position A' and position B of the turntable device 310, holds a finished 5-layer MEA material 8 from the receiving frame 311 at position H after the hot press bonding process by the vacuum holding means, and suitably stacks the finished 5-layer MEA material 8 in the external cartridge 400.

In further embodiments of the present invention, a plurality of the hot press devices 330 is suitably provided along the transfer path of the receiving frame 311. For example, a total of three hot press devices 330 may be preferably provided at position E, F and G, where the receiving frame 311 is stopped, on the top of the turntable device 310. In other further embodiments, a hydraulic actuator thereof presses the materials loaded on the receiving frame 311 of the turntable device 310 at suitably high temperature and high pressure to be bonded to each other.

Preferably, the materials on the receiving frame 311 sequentially pass through the plurality of hot press devices 330 along the transfer path thereof by the step-by-step rotation of the turntable device 310, and thus the multistage hot press process is performed.

In further embodiments, the invention features operation of an automatic bonding device, in which the stacking and bonding processes are suitably performed, as described herein.

According to certain embodiments, in the automatic bonding device 300 of the present invention, the turntable device 310 is preferably rotated 45° step by step in a state where the materials are suitably loaded on the respective receiving frames 311 so that the processes are performed in accordance with the materials on the respective receiving frames 311.

First, the scara robot 320 holds the GDL 7 by vacuum from the first GDL supply portion 301 and places the GDL 7 on the receiving frame 311 preferably at position A'.

Subsequently, the turntable device 310 is suitably rotated 45° and thus the receiving frame 311 with the GDL 7 preferably at position A' is transferred to position B. According to further embodiments, the receiving frame 311, the GDL 7 and the 3-layer MEA material 5 located preferably at position B are suitably transferred to position C.

In further related embodiments, the turntable 210 of the lift & turntable device 200 is suitably rotated 180° to load the 3-layer MEA material 5 after the punching process preferably at position A on the GDL 7 at position B. Next, the turntable 210 of the lift & turntable device 200 is suitably rotated 180° to wait for the supply of a 3-layer MEA material newly punched by the automatic punching device 100.

According to other preferred embodiments, the scara robot 320 holds the GDL 7 by vacuum from the second GDL supply portion 302 and preferably loads the same on the materials including the GDL at the bottom and the 3-layer MEA material at the top placed on the receiving frame 311 preferably at position C. In further preferred embodiments, five layers including the GDL at the bottom, the 3-layer MEA material in the middle, and the GDL at the top are successively stacked on the receiving frame 311 preferably at position C.

In other further preferred embodiments, the scara robot 320 preferably holds the GDL 7 by vacuum from the first GDL supply portion 301 and loads the same on the empty receiving frame 311 preferably at position A', and then the turntable device 310 is suitably rotated 45° again.

Next, preferably the turntable 210 of the lift & turntable device 200 is suitably rotated to load the newly punched 3-layer MEA material preferably at position A on the GDL at position B.

According to preferred embodiments of the invention, as the lift & turntable device 200, the turntable device 310, and the scara robot 320 are preferably successively operated, the receiving frame 311 of the turntable device 310 is suitably shifted step by step so that the GDL of the first GDL supply portion 301 is supplied to the receiving frame 311 preferably at position A', the 3-layer MEA material after the punching process is suitably loaded on the GDL preferably at position B, and the GDL of the second GDL supply portion 302 is suitably loaded on the 3-layer MEA material preferably at position C.

In other preferred embodiments, the 3-layer MEA materials 5 after the punching process are continuously supplied from the automatic punching device 100 of FIG. 3 to the automatic bonding device 300, and in further related embodiments, on the receiving frame 311 preferably at position B by the lift & turntable device 200.

According to certain embodiments of the invention, the 5-layer material loaded on the receiving frame 311 preferably at position C is suitably transferred to positions D, E, F, G and H step by step every time when the turntable device 310 is rotated 45° and, in certain preferred embodiments, especially, at positions E, F and G, the hot pressing process at high temperature and high pressure is suitably performed to bond the GDL by the respective hot press devices 330 at the corresponding positions.

According to preferred embodiments of the invention, if the materials are suitably stacked in a total of five layers at position C, a cover 312 is closed for the hot pressing process at high temperature and high pressure. Preferably, in this state, the materials at position C are transferred to position D by the 45° rotation of the turntable device 310 and, preferably, the materials at position D are transferred to position E by the next 45° rotation of the turntable device 310.

In preferred embodiments, at position E, the hydraulic actuator of the hot press device 330 is operated to suitably press the materials at high temperature and high pressure, and then the hot press device 330 preferably presses the materials at positions F and G repeatedly. Preferably, when the receiving frame 311 arrives at position H as the hot pressing process is completed, the cover 312 is suitably opened, and then the scara robot 320 picks up the finished 5-layer MEA material 8 at position H by vacuum suction and suitably stacks the same in the cartridge 400.

Accordingly, in preferred embodiments, the scara robot 320 continuously performs the process of holding the finished 5-layer MEA material 8 at position E and stacking the same in the cartridge 400, the process of placing the GDL of the first GDL supply portion 301 on the receiving frame 311 preferably at position A', and the process of loading the GDL of the second GDL supply portion 302 on the GDL of the receiving frame 311 preferably at position C.

Thus, in preferred embodiments, since the eight receiving frames 311 are continuously and circularly moved as the turntable device 310 is rotated in the automatic bonding device 300 of the present invention, the receiving frames 311 are kept at high temperature, and thus the time required to reach the high temperature is reduced. Moreover, since the hot pressing process at high temperature and high pressure is preferably successively performed at positions E, F and G by the rotation of the turntable device 310, the overall time required for the hot pressing process can be significantly reduced.

As described herein, as the punching and bonding processes for the MEA materials are performed automatically and continuously by improving a conventional method in which a 5-layer MEA material is manually manufactured, it is possible to reduce the time required to manufacture the 5-layer MEA material, provide a reduction in manpower and an efficient production, enable mass production, and improve the quality of the finished 5-layer MEA material.

Conventionally, a worker manually bonds the 5-layer MEA material and directly stacks the same in the cartridge; however, according to the invention as described herein, the robot device preferably picks up the 5-layer MEA material finished at position H and stacks the same in the cartridge, thus making it possible to improve precision and reduce time required to stack the finished material in the cartridge.

Furthermore, in the conventional manual bonding equipment, since the finished 5-layer MEA materials is not generated in continuous supply, an automatic stacking device is operated only after a necessary amount of the 5-layer MEA materials is gathered to complete the fabrication of the fuel cell stack. According to the 5-layer MEA automatic bonding apparatus as described herein, while the fuel cell stacks are suitably assembled by the operation of the automatic stacking device, the 5-layer MEA materials are fabricated and then stacked in the cartridge. Accordingly, it is possible to reduce the time required for the fabrication of the fuel cell stack as well as the fabrication of the 5-layer MEA material.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for automatically punching and bonding membrane electrode assembly (MEA) materials for a fuel cell, the apparatus comprising:
   an automatic punching device in which a supplied 3-layer MEA material passes through a punch press to form a manifold opening thereon, and a cutting process for cutting the punched 3-layer MEA material into individual materials;
   a first turntable device for continuously supplying the 3-layer MEA material after the automatic punching device to a second turntable device of an automatic bonding device; and
   the automatic bonding device comprising the second turntable device, on which a receiving frame for receiving the material is mounted, and a hot press device for a hot press bonding process, and performing the hot press bonding process wherein the 3-layer MEA material and a gas diffusion layer (GDL) are stacked on the receiving frame.

2. The apparatus of claim 1, wherein the automatic punching device comprises:
   a roll supply device for separating a backing sheet from a 3-layer MEA material roll and the separated 3-layer MEA material;
   a 1-axis robot device for clamping the front end of the 3-layer MEA material separated from the backing sheet and transferring the 3-layer MEA after the punching process and the cutting process to a turntable of the first turntable device; and
   the punch press arranged so that the 3-layer MEA material being transferred by the 1-axis robot device passes through an upper platen and a lower platen thereof and performing the punching process and the cutting process by the operation of the upper and lower platens.

3. The apparatus of claim 2, wherein the roll supply device comprises:
   an upper roller to which the 3-layer MEA material attached to the backing sheet is mounted; and
   a lower roller on which the backing sheet separated from the 3-layer MEA material released from the upper roller is wound.

4. The apparatus of claim 1, wherein the automatic bonding device comprises:
   the second turntable device including a plurality of the receiving frames circularly moved during rotation;
   a scara robot provided in the middle of the second turntable device and picking up the GDLs of GDL supply portions to place the GDLs on the receiving frames of the second turntable device and transferring a finished 5-layer MEA material after the hot press bonding process from the receiving frame to a cartridge; and
   the hot press device arranged so that the receiving frame circularly moved passes therethrough and hot-press bonding the 3-layer MEA material and the GDL on the receiving frame of the second turntable device.

5. The apparatus of claim 4, wherein the scara robot successively performs a process of picking up the GDLs of the GDL supply portions to place the GDL on an empty receiving frame and on the 3-layer MEA material on the receiving frame and transferring the finished 5-layer MEA material after the hot process bonding process from the receiving frame to the cartridge every time when the second turntable device is rotated step by step.

6. The apparatus of claim 4, wherein the plurality of receiving frames are circularly arranged at regular intervals on the second turntable device.

7. The apparatus of claim 6, wherein the plurality of the hot press devices are provided along the transfer path of the receiving frames so that the materials on the receiving frame sequentially pass through the plurality of hot press devices along the transfer path thereof by the step-by-step rotation of the second turntable device and thus a multistage hot press process is performed.

8. An apparatus for punching and bonding membrane electrode assembly (MEA) materials for a fuel cell, the apparatus comprising:
   a punching device in which a supplied MEA material passes through a punch press to form a manifold opening thereon;
   a bonding device comprising a turntable device, on which a receiving frame for receiving the material is mounted, and a hot press device for a hot press bonding process, and performing the hot press bonding process when the receiving frame, on which the MEA material and a gas diffusion layer (GDL) are stacked, is transferred during rotation of the turntable device,
   wherein the punching device further comprises a cutting unit for cutting the punched 3-layer MEA material into individual materials.

9. The apparatus for punching and bonding MEA materials for a fuel cell of claim 8, wherein the MEA material is a 3-layer MEA material.

* * * * *